Jan. 5, 1943.   J. B. HOWER   2,307,405
NUT
Filed Sept. 24, 1940
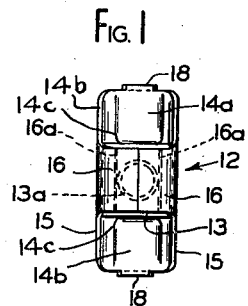
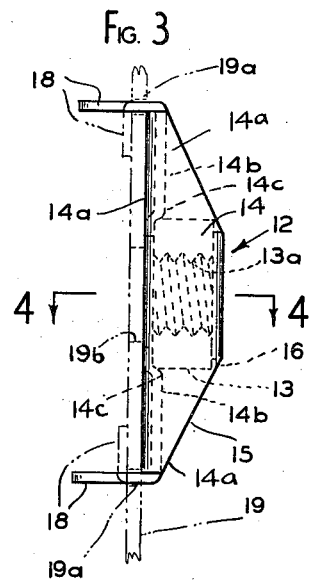
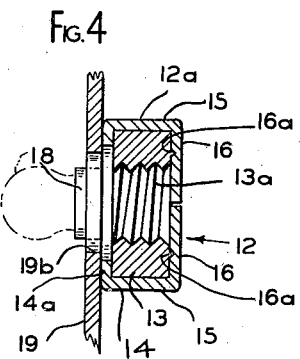
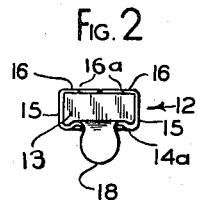
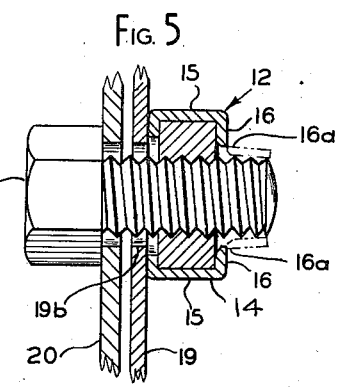
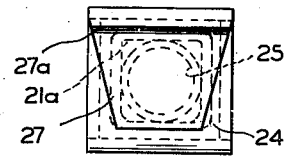
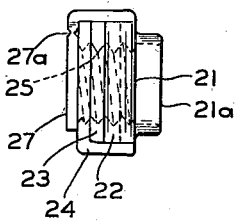
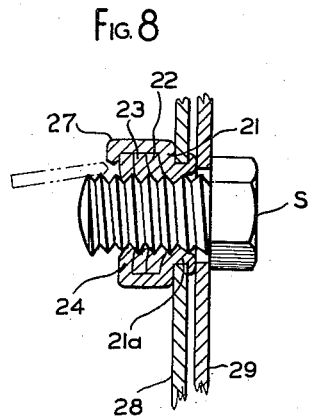
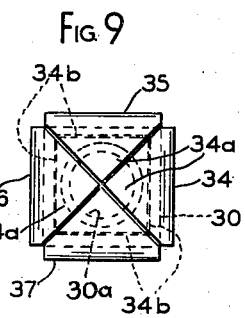
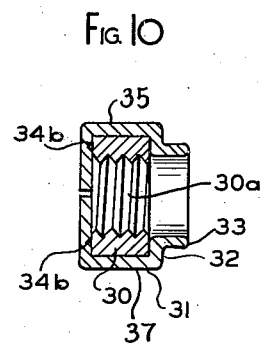
INVENTOR.
John B. Hower
BY
J Ralph Barrow Patented Jan. 5, 1943

2,307,405

UNITED STATES PATENT OFFICE 2,307,405

NUT

John B. Hower, Akron, Ohio, assignor to Akron-Selle Company, Akron, Ohio, a corporation of Ohio Application September 24, 1940, Serial No. 358,072

4 Claims. (Cl. 85—32)

This invention relates to nuts, and more particularly relates to nuts of the type used for securing two parts of a fabricated structure together, wherein the nut is clinched or anchored onto one part of the structure to permit threading a bolt or screw into the nut without manually holding the same.

Heretofore, nuts of the character described have been provided, but in the fabrication of automobile bodies, for example, it is frequently necessary or desirable to coat or paint sound-deadening or insulating material on the inside surface of the part of the body to which the nuts are anchored before the bolts or screws are threaded into the nuts, such coatings entering the threaded apertures to interfere with or prevent threading the bolts or screws therein.

A purpose of the present invention is to provide an improved nut unit of the character described having a portion normally closing one end of the threaded aperture thereof against entry of fluid substances such as sound insulating material, said portion being adapted to be distorted or severed upon threading a bolt or screw into the nut.

Another purpose of the invention is to provide a nut unit as described in the preceding paragraph, in which said portion closing the threaded aperture is formed as an extension of a part of the nut assembly or unit, so that said portion cannot become loose or be removed in handling or otherwise, subsequent to threading a bolt or screw in the nut.

These and other objects of the invention will be manifest from the following brief description and the accompanying drawing.

Of the accompanying drawing:

Figure 1 is a front elevation of a nut unit embodying the invention.

Figure 2 is an end view thereof.

Figure 3 is an enlarged side elevation, as viewed from the left of Figure 1, the method of clinching the nut unit onto a sheet metal part, in the process of assembly or fabrication, being illustrated in chain-dotted lines.

Figure 4 is a cross-section taken on line 4—4 of Figure 3 in the clinched-on position of the nut.

Figure 5 is a view similar to Figure 4 illustrating the manner in which a bolt or screw threaded into the nut distorts or severs the protective portions covering the threaded aperture of the nut.

Figure 6 is a front view of a modified form of the invention, the same being a fabricated one-piece nut unit.

Figure 7 is a side elevation as viewed from the right of Figure 6.

Figure 8 is a cross-section illustrating the nut unit with a bolt applied thereto for securing two parts of a structure, the aperture-protecting portion of the nut being distorted or severed by the bolt.

Figure 9 is a view similar to Figure 6, illustrating a two-piece nut unit with the improved aperture protecting means incorporated therein.

Figure 10 is a cross-section through the nut shown in Figure 9.

Referring particularly to Figures 1 to 5 of the drawing, the numeral 12 designates generally a nut unit, which may comprise a standard square nut 13 and casing 14 of sheet metal formed or stamped out, by known methods, with a longitudinal base portion 14$^a$, engaging one end of the nut, and spaced side-walls 15, 15, extending at right angles to the base for engaging opposite edges of the nut, these side-walls terminating in inwardly turned tangs 16, 16 which embrace the other end of the nut and substantially join at the center, proportional parts of the tangs overlying the end of the threaded aperture 13$^a$ to close the same to the exterior. The tangs 16 preferably are substantially the width of square nut 13, but are essentially wider than the diameter of the threaded aperture 13$^a$. The tangs 16 may be scored, grooved or otherwise weakened on the inner faces thereof at 16$^a$, 16$^a$, so that a bolt or screw B threaded through aperture 13$^a$ of the nut 13 will readily distort, displace or sever the portions of the tangs covering said aperture, as shown in Figure 5, without disturbing the gripping action of the tangs at the edge portions of the nut.

The longitudinally extending portions 14$^b$, 14$^b$ of base 14$^a$ may be embossed at 14$^c$, 14$^c$, firmly to retain the square nut 13 against longitudinal movement in its casing. Extending substantially at right angles from base 14 may be integral tongue portions 18, 18, for clinching the nut unit 11 onto one part 19 of a structure being assembled or fabricated, preparatory to securing another part 20 thereto.

In the use of the form of the invention shown in Figures 1 to 5, as for example, in assembling or fabricating an automobile body, the tongues 18, 18 may be inserted in suitable apertures 19$^a$, 19$^a$ in one part 19 of the body structure, to position the threaded aperture 13$^a$ of the nut unit in cooperation with a bolt aperture 19$^b$ in part 19, the tongues then being bent or clinched over (see Figure 3), firmly and non-rotatably, to anchor the nut unit onto said part. With nut unit 14 so anchored, the interior surface of the part 19 may have a coating of sound-deadening or like material painted or sprayed thereon, in accordance with known practice, the inner extensions of tangs 16 preventing such material from entering the threaded apertures 13a, so that subsequent threading of a bolt or screw B into the nut unit will not be prevented or retarded. When bolt or screw B is threaded into the nut unit, to secure a part 20 to part 19, for example, as shown in Figure 5, the end of the bolt will urge the inner portions of the tangs 16 outwardly about the scoring or notches 16a said portions then being either distorted out of the way of the bolt end, or broken off, according to the type of metal used or the depth of the scoring 16a. In any case, the ends of the tangs 16 are readily distorted or severed without disturbing the gripping action of the portions of the tangs engaging over the edges of the square nut 13.

Referring to Figures 6, 7 and 8, the invention may be embodied in a one-piece nut unit, of the type described in Patent Number 2,090,125. Briefly, this nut unit comprises a central portion 21 from which tangs 22, 23 and 24 are folded inwardly and lapped over the central portion 21 from three sides to form a nut body, this body being punched and extruded to provide a central opening 25 which is then threaded, as shown in Figure 7. Folded and lapped over the fabricated nut body is a fourth tang 27 which provides a closure for protecting the threaded opening against passage of sound-deadening material, in the manner described in connection with Figures 1 to 5.

The tang 27 may be scored or otherwise weakened, as indicated at 27a, whereby the protective portion overlying the threaded opening may be distorted or severed, as shown in chain-dotted lines in Figure 8, upon threading a bolt or screw S into the nut. A squared, or otherwise non-circular clinching rim 21a, formed by the punching and extruding operations, is provided in the central portion 21 for non-rotatably clinching the nut unit to one part 28 of a structure being fabricated or assembled, so that another part 29 may be secured thereto by threading the bolt or screw S into said nut unit, as previously described.

Figures 9 and 10 illustrate the invention incorporated in a two-piece nut unit, which may comprise a standard square nut body 30 having a threaded aperture 30a, and a casing 31 of sheet material embracing the same. Casing 31 may be formed with a central portion 32 engaging one end face of the nut, said portion having thereon a non-circular clinching rim 33, defining an opening cooperating with aperture 30a, rim 33 being adapted for clinching or anchoring the nut unit in the manner previously described in connection with Figure 8. Integral tangs 34, 35, 36 and 37 extend at right angles from central portion 32 to embrace the straight edge portions of nut 30, these tangs each terminating in triangular portions 34a, 34a, lapped over the other end face of the nut, with the apices of the triangular portions substantially at the center of the nut aperture 30a, and the adjacent edges of said portions substantially close together to seal said aperture against entry of sound-deadening materials or the like, as previously described. The portions 34a may be weakened, scored, or grooved at 34b, 34b, whereby threading a bolt or screw (not shown) into aperture 30a will distort or sever the triangular portions 34a, somewhat as illustrated in Figure 8.

Modifications of the invention may be resorted to without departing from the spirit thereof or the scope of the appended claims.

What is claimed is:

1. A nut unit comprising a nut body having a threaded aperture for reception of an externally threaded element, and a casing of sheet material embracing said body, said casing having means thereon for clinching or anchoring the nut unit to a part of a structure being assembled or fabricated, said casing having a distortable tang normally closing one end of said threaded aperture, said tang adapted to be distorted outwardly of said body upon threading an externally threaded element into said aperture.

2. A nut unit comprising a body portion having a threaded aperture therein for reception of an externally threaded element, said body having means thereon for clinching or anchoring the nut unit to a part of a structure being assembled or fabricated, said body having a distortable tang integral therewith and normally closing one end of said threaded aperture, said tang thereby being distortable outwardly of said body by threading an externally threaded element into said aperture.

3. A nut unit comprising a body portion having a threaded aperture therein for reception of an externally threaded element, said body having means thereon for clinching or anchoring the nut unit to a part of a structure being assembled or fabricated, and a tang having a weakened connection onto said body and normally closing an end of said threaded aperture, said tang being adapted to be distorted or severed from said body upon threading an externally threaded element through said aperture.

4. A nut unit comprising a nut body having a threaded aperture therethrough, a piece of sheet metal formed to embrace said nut body and having an opening cooperating with one end of said aperture in the nut body, said piece having cooperating free end portions folded and lapped over said nut body normally to close the other end of said aperture thereof, and means on said piece for securing the nut unit to a part of a construction being assembled or fabricated, said free end portions being weakened along lines outwardly of said threaded aperture whereby they are readily distorted or severed upon threading a bolt or screw though said threaded aperture.

JOHN B. HOWER.